(12) United States Patent
Niedecker et al.

(10) Patent No.: US 11,213,036 B2
(45) Date of Patent: Jan. 4, 2022

(54) SYSTEM FOR TRANSFERRING SAUSAGE-SHAPED PRODUCTS AND METHOD THEREFORE

(71) Applicant: Poly-clip System GmbH & Co. KG, Hattersheim (DE)

(72) Inventors: Frank Niedecker, Porza (CH); Jörg Sames, Alten Buseck (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 16/859,908

(22) Filed: Apr. 27, 2020

(65) Prior Publication Data

US 2020/0337318 A1    Oct. 29, 2020

(30) Foreign Application Priority Data

Apr. 29, 2019    (EP) .................................. 19171704

(51) Int. Cl.
A22C 11/00    (2006.01)
(52) U.S. Cl.
CPC .................. A22C 11/008 (2013.01)
(58) Field of Classification Search
CPC ... A22C 11/008; A22C 11/02; A22C 11/0245; A22C 11/0254; A22C 11/00
(Continued)

(56) References Cited

U.S. PATENT DOCUMENTS 3,857,330 A * 12/1974 Ruckstaetter ............ A22C 7/00
                                                        99/354
5,057,055 A * 10/1991 Michaud .................. B65B 19/34
                                                        452/51
(Continued)

FOREIGN PATENT DOCUMENTS

| CA | 2330850 A1 | 11/1999 |
|----|-----------|---------|
| EP | 1797761 A1 | 6/2007 |
| EP | 2609809 A1 | 7/2013 |

OTHER PUBLICATIONS

EPO; Application No. 19171704.0; Extended European Search Report dated Oct. 29, 2019.

*Primary Examiner* — Richard T Price, Jr.
(74) *Attorney, Agent, or Firm* — Fitch, Even, Tabin & Flannery LLP (57) ABSTRACT

The present invention relates to a system for transferring sausage-shaped products, containing a flowable filling material in a tubular or bag-shaped packaging casing from a discharge device of a processing machine for processing the sausage-shaped products to a handling device for the sausage-shaped products. The system comprises a belt conveyor device for subsequently receiving sausage-shaped products discharged from the discharge device in a discharge direction and for conveying the sausage-shaped products in a feeding direction to a releasing position in which the sausage-shaped products can be removed from the belt conveyor device, a drive assembly for driving said belt conveyor device in the feeding direction being at least substantially parallel to the discharge direction of the discharge device, a guiding assembly for guiding the sausage-shaped products when conveyed by the belt conveyor device in the feeding direction and at least one shaping box for subsequently receiving a sausage-shaped product released from the belt conveyor device in the releasing position, wherein the at least one shaping box is provided at least substantially underneath the belt conveyor device in a receiving position for receiving the sausage-shaped product released in a release direction substantially perpendicular to the feeding direction.

17 Claims, 2 Drawing Sheets

(58) Field of Classification Search
USPC .................................. 452/30–32, 35, 37, 51
See application file for complete search history.

(56) References Cited

U.S. PATENT DOCUMENTS

| | | | | |
|---|---|---|---|---|
| 5,468,179 | A * | 11/1995 | Stanley | A22C 11/02 |
| | | | | 452/174 |
| 6,234,891 | B1 | 5/2001 | Klaassen | |
| 7,520,801 | B2 * | 4/2009 | Epstein | A22C 7/0023 |
| | | | | 452/30 |
| 2004/0043718 | A1 * | 3/2004 | Shefet | A22C 11/001 |
| | | | | 452/35 |
| 2006/0183413 | A1 * | 8/2006 | Florindo | A22C 15/001 |
| | | | | 452/22 |
| 2008/0070489 | A1 * | 3/2008 | Bachtle | A22C 11/107 |
| | | | | 452/46 |
| 2011/0124276 | A1 * | 5/2011 | Waldrop | A22C 11/008 |
| | | | | 452/51 |
| 2011/0223846 | A1 * | 9/2011 | Baechtle | A22C 11/006 |
| | | | | 452/49 |
| 2015/0099441 | A1 * | 4/2015 | Le Paih | A22C 11/105 |
| | | | | 452/48 |

* cited by examiner

SYSTEM FOR TRANSFERRING SAUSAGE-SHAPED PRODUCTS AND METHOD THEREFORE

CROSS-REFERENCE TO RELATED APPLICATION

The present application claims the benefit of priority of European Patent Application No. 19171704.0 filed on Apr. 29, 2019, the contents of which are incorporated herein by reference in their entirety.

FIELD OF THE INVENTION

The present invention relates to a system for transferring sausage-shaped products filled with a flowable filling material and a method for controlling a system for transferring sausage-shaped products, like sausages.

BACKGROUND OF THE INVENTION

In practice, it is known that, for example in the production of sausage-shaped products, like sausages, the consumer in many cases expresses the wish that the sausage, when ready for consumption, has a different cross-section than a circular cross-section which a casing of the sausage normally assumes during filling. For example, it is often desired that the sausage, when ready for consumption, has a rectangular cross-section, usually approximately quadratic, which makes it suitable, for instance, for topping on toasts. In cases where the market therefore requires a ready-to-eat sausage with a cross-section which is approximately quadratic or different from the circular shape, so-called rectangular sausages, the filled sausage casing is formed or rather pressed to its final cross-section in an appropriate shape after filling and closing of the sausage by closure means like closure clips. In this shape, the sausage is stabilized in its final shape by appropriate treatment, e.g. boiling. Since the circular cross-section is larger than any other cross-section at the same circumference as the filled sausage, a sausage casing which is to be formed into another cross-section, in particular a rectangular one, after filling and sealing must not be fully filled.

A tightly filled tubular or circular sausage normally cannot be pressed into another cross-section without damaging the usually non-stretchable sausage casing. For this reason, sausages intended to be pressed into a different cross-section than the circular cross-section must not be completely filled or slackly filled so that the sausage can be transformed from a circular to a rectangular shape with a smaller cross-section. When filling such slackly filled sausages, it may be important to ensure that, despite the incomplete filling and the resulting flaccidity of the sausage, there are no significant air inclusions so that, after pressing, the final shape of the sausage is also free of air, as it is generally the case with sausages.

After filling a slackly filled sausage, the flowable filling material has to be redistributed in the casing of said sausage. In EP patent application 1 797 761, a device for distributing of paste-like filling material in a slackly filled sausage-shaped product having a circular cross-section is described. For this purpose, the slackly filled sausage-shaped product with the circular cross-section is shaped by means of two conveyer belts which are arranged such that the sausage-shaped product is located between the conveyor belts forming a shaping device. At the end of the conveyor belts, the sausage-shaped product falls in a shaping case or shaping box, respectively, by which the sausage-shaped product is formed so as to have the desired shape.

However, it is difficult to convey an unboiled sausage from a conveyor belt into the shaping box, as the sausage tends to buckle or even to break open. Moreover, it is likely that the sausage does not completely fall in the shaping box, due to frictional effects between the inner surfaces of the shaping box and the outer surface of the sausage.

In addition, the shaping box is located in the conveying direction of the slackly filled sausage behind the shaping device. This requires a relatively large amount of space in the longitudinal direction for this well-known system.

Further disadvantages may occur, if an operating person has to pick up the sausages, which can generally weigh up to 15 kg, from the conveyor belt and has to place the sausages into the shaping boxes by hand.

Thus, it is an object of the present invention to provide a system for transferring sausage-shaped products, like sausages, and a method for controlling a system for transferring sausage-shaped products, like sausages, which are capable of solving the afore-said problems.

The objective is achieved by a system for transferring sausage-shaped products, like sausages, and a method for controlling a system for transferring sausage-shaped products, like sausages, according to the present invention as defined in the independent claims. Further developments of the invention are defined in the dependent claims.

SUMMARY OF THE INVENTION

According to a first aspect of the present invention, there is provided a system for transferring sausage-shaped products, like sausages, containing a flowable filling material in a tubular or bag-shaped packaging casing from a discharge device of a processing machine for processing the sausage-shaped products to a handling device for the sausage-shaped products. The system comprises conveyor means in the form of a belt conveyor, for subsequently receiving sausage-shaped products discharged from the discharge device in a discharge direction, preferably oriented at least substantially horizontally, and for conveying the sausage-shaped products in a feeding direction, preferably oriented at least substantially horizontally, to a releasing position in which the sausage-shaped products can be removed from the conveyor means, drive means in the form of a drive assembly that includes a drive device, like an electric motor coupled to an axle of one of the deflection rollers of the belt conveyor, for driving said conveyor means in the feeding direction, preferably being at least substantially parallel or rather coaxial to the discharge direction of the discharge device, guiding means or a guiding assembly for guiding the sausage-shaped products when conveyed by the belt conveyor in the feeding direction, and at least one shaping box for subsequently receiving a sausage-shaped product released from the belt conveyor in the releasing position, wherein the at least one shaping box is provided at least substantially underneath or laterally underneath the belt conveyor in a receiving position for receiving the sausage-shaped product released in a release direction substantially perpendicular to the feeding direction, preferably at least in a substantially vertical direction.

In accordance with the inventive solution described above, a shaping box is positioned in the receiving position for receiving a sausage-shaped product conveyed by the conveyor means in the feeding direction to the release position simultaneously or shortly before or shortly after the sausage-shaped product has been fed to the release position.

In principle, the shaping box can be arranged individually in the receiving position, for example by an operator. It is more advantageous if the shaping boxes are conveyed along a conveyor line in a shaping box feeding direction to the receiving position by means of conveying means for the shaping boxes and, if necessary, corresponding guide means. Here, preferably, the shaping boxes can be taken out of a stock and brought by means of suitable means to the conveyor line of the conveying means for feeding the shaping boxes to the receiving position.

Here, the guiding means for the shaping boxes can be designed in different ways. For example, it is possible that the guiding means for the shaping boxes are arranged by two guiding rails or walls at each side edge of the conveying means for the shaping boxes.

The inventive transfer system enables a sausage-shaped product to be guided to the release position by means of the conveyor means and the guiding means in the feeding direction and at the same time or shortly before or shortly after a shaping box below the fed sausage-shaped product can be fed to the receiving position in a shaping box feeding direction such that the feeding direction of the conveyor means and the box feeding direction of the conveying means for the shaping boxes intersect at an angle of preferably at least approximately 90°. This allows a space-saving structure for transferring sausage-shaped products, which preferably are only partially or slackly filled with the filling material, into shaping boxes. In addition, the invention allows to transfer in particular subsequently sausage-shaped products from a discharge device via the conveyor means into a shaping box fully automated. Thereby enhancing process speed, accuracy of placing the sausage-shaped product into the shaping box and also relieving the operating persons as they do not have to lift up and carry the shaping boxes filled with sausage-shaped products.

In some embodiments, the guide means comprise at least two side walls which are arranged parallel to the feeding direction with a distance to each other substantially corresponding to the width or diameter of the sausage-shaped products to be conveyed by the conveyor means, and wherein the side walls are preferably mounted laterally above the conveyor means so that the sausage-shaped products on the conveyor means are guided by the side walls. This ensures safe transport of the sausage-shaped products and, in particular, precise positioning of the products at right angles to the feeding direction or conveying direction of the conveyor means, preferably in an at least approximately horizontal plane.

In some embodiments, the at least two side walls of the guide means are reversibly movable away and towards each other in a shifting direction perpendicular to the feeding direction, and wherein the side walls preferably move simultaneously. Thus, it is possible to push the sausage-shaped product off the conveyor means in a direction perpendicular to the feeding direction and let the sausage-shaped product fall into the shaping box over the complete length at substantially the same time without bending the sausage-shaped product.

In some embodiments, the conveyor means or belt conveyor include a first conveyor belt and a second conveyor belt, preferably oriented at least substantially horizontally, wherein the second conveyor belt is arranged laterally and parallel to the first conveyor belt, and shifting means in the form of a shifting assembly including one or more linear drive elements, like piston/cylinder arrangements, a spindle drive or the like, for reversibly shifting or moving, respectively, the conveyor belts of the conveyor means away and towards each other in a shifting direction perpendicular to the feeding direction, preferably at least substantially horizontally. According to this, it is possible to form a passage gap between the two conveyor belts through which the sausage-shaped product can fall into a shaping box, preferably as a result of gravity, over the complete length at substantially the same time without bending the sausage-shaped product. In addition to or as an alternative to this, an actively driven means can be provided for moving the sausage-shaped product from the release position to the shaping box positioned in the receiving position.

In some embodiments, the conveyor means include a single conveyor belt, and shifting means or a shifting arrangement for reversibly shifting the single conveyor belt in a shifting direction perpendicular to the feeding direction, preferably horizontally. According to this, it is also possible to let the sausage-shaped product fall into the shaping box over the complete length at substantially the same time without bending the sausage-shaped product. Further, there is only one conveyor belt which has to be shifted. Preferably, a guide or baffle plate can be used additionally or alternatively which extends from the single conveyor belt in the direction of the shaping box and which guides the sausage-shaped product when moving from the single conveyor belt in the direction of the shaping box.

In some embodiments, the shaping box positioned in the receiving position has a longitudinal axis which is parallel to the feeding direction.

In some embodiments, the at least one shaping box has a length equal to or slightly larger than that of a sausage-shaped product to be received therein and a width which corresponds to the desired width of the final shape of the sausage-shaped product. By doing this, it is ensured that the sausage-shaped product falls or rather slips completely into the shaping box without bending, breaking or the like.

In order for the sausage-shaped product to reach the shaping box from the release position reached by means of the conveyor means without damage, it is necessary to align the position of the sausage-shaped product and the shaping box against each other. For supporting this issue, in some embodiments, detection means or a detection device, are positioned such that a desired releasing position of the sausage-shaped product on the conveyor means is detected.

Alternatively or additionally, in some embodiments, at least one stopper element is positioned such that the sausage-shaped product is stopped on the conveyor means at a desired releasing position. The stopper element can be adjusted in order to adjust its position, i.e. the release position, according to the sausage-shaped product to be transferred.

In some embodiments, positioning means or a positioning device are arranged such that the releasing position of the sausage-shaped product and/or the receiving position of the shaping box can be detected by at least one sensor, preferably several sensors, more preferably a sensor for each position and/or function, such as an optical sensor or a touch sensor. This makes it possible to coordinate the positioning of the sausage-shaped product and the shaping box in such a way that the sausage-shaped product conveyed by the conveyor means is positioned in the releasing position that allows the sausage-shaped product to be transferred from the conveyor means to the shaping box in such a way that damage to the product is ruled out, since the box is also in a suitable position.

In some embodiments, the detection means, the at least one stopper element and/or the positioning means are adjustable depending on the dimensions of the sausage-shaped product. This means that the system can be adapted to different types of sausage-shaped products, in particular products of different lengths and/or widths, or products with different diameters, as well as appropriately designed shaping boxes.

The guiding means can be designed in different ways. A particularly simple and thus cost-effective solution is achieved by the fact that the guiding means are formed by two guide walls or rather side walls or guide rails each arranged on both sides of the conveyor means and extending at least approximately perpendicular to the conveyor plane, preferably a horizontal plane, defined by the conveyor means, wherein they can preferably be made of a metal sheet.

In some embodiments, the guiding means can be moved towards and away from each other depending on the dimensions of the sausage-shaped product.

According to this, the system may be adapted to the size of the sausage-shaped products.

In some embodiments, the system further comprises a bridge which connects the discharge device and the conveyor means. By doing this, an undesired bending or tilting of the sausage-shaped product between the discharge device and the conveyor means when the sausage-shaped product is delivered from the processing machine to the inventive transfer system may be avoided efficiently.

In some embodiments, multiple shaping boxes are arranged in a shaping box handling device underneath the conveying means, wherein the shaping boxes are lined up in a row in a box feeding direction. By doing this, approximately 15 sausage-shaped products may be filled in respective shaping boxes per minute, thereby enhancing cycle times.

In some embodiments, the system further comprises a redistribution device comprising at least one redistribution roller arranged between the discharge device and the conveyor means for redistributing the flowable filling material in the sausage-shaped product.

According to the present invention, there is provided a method for controlling a system for transferring sausage-shaped products, like sausages, containing a flowable filling material in a tubular or bag-shaped packaging casing from a discharge device of a processing machine for processing the sausage-shaped products to a handling device for said sausage-shaped products. The method comprises the steps of transferring the sausage-shaped products from the discharge device to the conveyor means, subsequently conveying the sausage-shaped products in the feeding direction by the conveyor means to a releasing position, while the sausage-shaped product is guided by the guiding means, subsequently releasing the sausage-shaped products by shifting the conveyor means or the guiding means in the shifting direction substantially perpendicular to the feeding direction, preferably horizontally, and receiving the sausage-shaped product in the shaping box positioned in the receiving position, which is situated at least substantially underneath or laterally underneath the conveyor means.

In some embodiments, the filled shaping box is transferred in an end position in which the filled shaping box is picked up by the handling device.

The expressions such as "up", "down", "above", "below", "on top", "beneath", or analogous expressions for a relative spatial position along a vertical axis, if any, used in the following description refer to an orientation of the objects shown in the figures in such a way that the reference signs used in these drawings can be read in a normal orientation.

Moreover, the expressions such as "in front", "behind", "left" and "right" or analogous expressions for a spatial position relative to a viewer are defined relative to the viewer's perspective view on the drawings, wherein "in front" or analogous expressions relate to a relative position closer to the viewer, and "behind" or analogous expressions relate to a relative position further away from the viewer.

DETAILED DESCRIPTION

Figure 1:
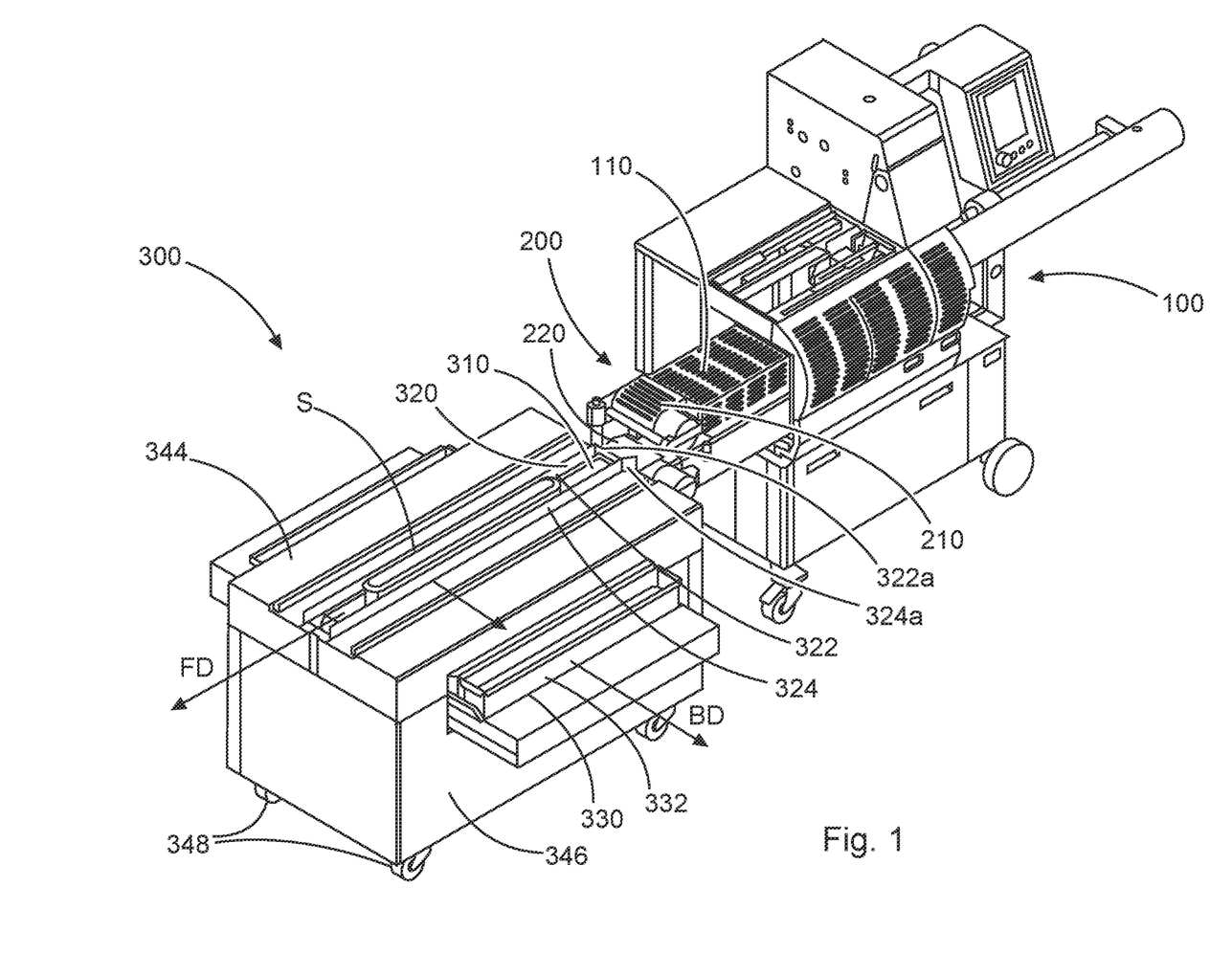
FIG. 1 shows a perspective view of a system for transferring sausage-shaped products, like sausages, according to an embodiment of the present invention.
Figure 2:
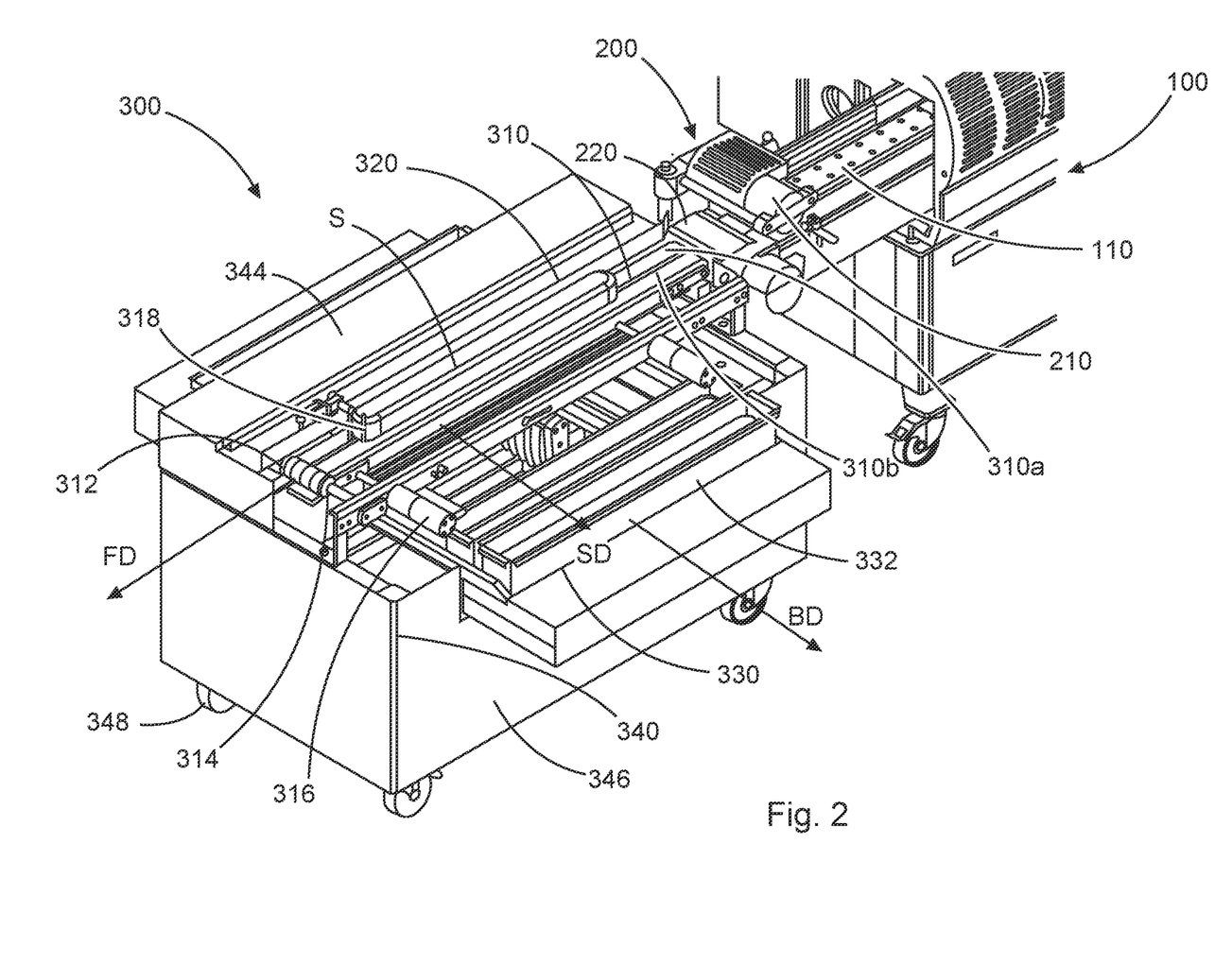
FIG. 2 shows an enlarged perspective view of the system shown in FIG. 1 with partially exposed interior.

FIG. 1 shows a perspective view of a system 300 for transferring sausage-shaped products S, like sausages, containing a flowable filling material from a discharge device 110 of a processing machine 100 for processing the sausage-shaped products S, like a clipping machine, to a handling device (not shown) such as a robot for a further processing of the sausage-shaped products S, like a storing device or a cooking device, according to a preferred embodiment of the present invention. Further, FIG. 2 shows an enlarged perspective view of the system 300 shown in FIG. 1 with partially exposed interior.

System 300 comprises as main components conveyor means 310 in the form of a belt conveyor preferably including a first conveyor belt 310a and a second conveyor belt 310b arranged laterally and parallel to each other for receiving sausage-shaped products S from discharge device 110 and defining a conveyor plane extending preferably and at least substantially horizontally, drive means 312 realized by a drive assembly that includes a drive device, like an electric or fluid driven motor coupled to an axle of one of the deflection rollers of the belt conveyor for driving the conveyor means 310 in a feeding direction FD to a release position, guiding means 320 or a guiding assembly for guiding sausage-shaped products S when transferred by conveyor means 310 from discharge device 110 to a release position of transfer system 300, and at least one shaping box 332 positioned in a receiving position for receiving a sausage-shaped product S, wherein shaping box 332 is provided underneath or rather laterally underneath conveyor means 310.

Processing machine 100 may be, for instance, a so-called clipping machine in which sausage-shaped products S are clipped or rather closed and preferably separated from each other. For transferring sausage-shaped product S to system 300, discharge device 110 of processing machine 100, as for instance a conveyor belt which defines a horizontally extending conveyor plane, may be provided which conveys sausage-shaped product S in a discharge direction DD, preferably horizontally. It should be noted that discharge device 110 may also be any transferring device which transports sausage-shaped products S to system 300 or a simple chute.

Further, a so-called redistribution device 200 having at least one redistribution roller 210 may be provided at the end of discharge device 110. Redistribution device 200 is capable of redistributing flowable filling material in sausage-shaped product S partially or slackly filled. It does not matter whether the redistribution rollers 210 are arranged horizontally or vertically. A horizontal arranged redistribution roller 210 has the advantage that only one redistribution roller 210 is required, as the discharge device 110 of processing machine 100 may act as a further redistribution roller 210.

A bridge 220 may be provided to connect discharge device 110 and system 300. Bridge 220 may either be attached to discharge device 110 and/or to system 300 by suitable connection means, such as a foldable hinge, preferably having a locking mechanism. Bridge 220 serves to bridge end sections of discharge device 110 of processing machine 100 and conveyor means 310 of system 300, in order to avoid an undesired bending or tilting of sausage-shaped product S between said end portions.

Advantageously, bridge 220 which preferably consists of a food-safe material such as stainless steel is preferably not in contact with discharge device 110, in order to avoid undesired frictional effects or damages to discharge device 110. By doing this, a suitable locking mechanism to engage bridge 220 in a predefined position having preferably the same height as discharge device 110 is provided. Further, bridge 220 or end portion of bridge 220 may consist of a friction-resistant material, whereby it is possible to let bridge 220 stay in contact with discharge device 110. In this case a locking mechanism is not mandatory.

In the present embodiment, conveyor means 310 of system 300 are preferably arranged in line with said discharge device 110 of processing machine 100, in order to receive sausage-shaped product S from the same, wherein conveyor means 310 are mounted on a frame 340 preferably centered along the longitudinal axis which is parallel to the direction of movement of conveyor means 310.

Frame 340 preferably has a rectangular shape, wherein frame 340 comprises a lower side 342 facing to the ground and a parallel opposing upper side 344. On lower side 342 of frame 340, preferably four rollers 348 are attached to respective corners of rectangular frame 340, for moving or rather positioning frame 340 of system 300 as required. Further, rollers 348 may have a brake or the like to prevent frame 340 from moving unintentionally. Rectangular frame 340 is preferably at least laterally and more preferably completely covered by food-safe sheets 346, which are made of stainless steel or the like. Sheets 346 are preferably used to avoid accidents, to protect the interior and/or to facilitate cleaning.

Conveyor means or belt conveyor 310 comprises at least one endless conveyor belt 310a, drive means 312 and at least one deflection roller 314 for driving said conveyor belt 310a in feeding direction FD which is at least substantially parallel or rather coaxial to discharge direction DD, wherein the sausage-shaped product S is conveyed on a product-conveying portion of belt conveyor 310 in feeding direction FD.

In the present embodiment, conveyor means or belt conveyor 310 comprise a first conveyor belt 310a and a second conveyor belt 310b, wherein second conveyor belt 310b is arranged laterally and parallel to first conveyor belt 310a. Both conveyor belts 310a, 310b define an at least substantially horizontally extending conveying plane. It may be advantageous to drive conveyor belts 310a, 310b independently, in order to compensate inclination of sausage-shaped product S positioned on conveyor belts 310a, 310b, for instance. In the present embodiment, conveyor belts 310a, 310b are driven simultaneously in the same direction.

Guiding means or guiding assembly 320 is provided for guiding sausage-shaped product S when transferred by conveyor means 310 in feeding direction FD, wherein guiding assembly 320 comprises at least two side walls 322, 324 which are arranged parallel to feeding direction FD with a distance to each other substantially corresponding to the desired width of sausage-shaped product S.

Side walls 322, 324 are preferably mounted laterally above conveyor means 310 in a vertical manner and substantially parallel to feeding direction FD so that sausage-shaped products S conveyed on said conveyor means 310 are guided by said side walls 322, 324 of guiding means 320. Further, side walls 322, 324 of guiding means 320 may have funnel-shaped inlet portions 322a, 324a to center sausage-shaped product S on conveyor means 310 and further to facilitate its shaping through side walls 322, 324.

Depending on the desired width of sausage-shaped product S, the distance between side walls 322, 324 is preferably adjustable as required, for instance, mechanically, electrically or hydraulically. Side walls 322, 324 are preferably made of a rigid food-safe material such as stainless steel.

Further, guiding means 320 may serve as a redistribution device, wherein guiding means 320 are capable of redistributing flowable filling material in sausage-shaped product S. According to this, it may be advantageous, if side walls 322, 324 of guiding means 320 have initial sections following funnel-shaped inlet portions 322a, 324a that are inclined towards each other. In this case, funnel-shaped inlet portions 322a, 324a may be omitted.

Frame 340 of system 300 further houses a shaping box handling device 330 preferably underneath conveyor means 310. Shaping box handling device 330 is configured to convey shaping boxes 332 preferably horizontally in a direction which is perpendicular to feeding direction FD. Moreover, preferably single shaping boxes 332 are inserted at one end of shaping box handling device 330 in an insertion position, wherein shaping box 332 to be filled with sausage-shaped product S is conveyed to a receiving position, preferably directly underneath or laterally underneath conveyor means 310 and, after receiving sausage-shaped product S, is advanced to a removal position or rather an end position for removing respective shaping box 332 filled with said sausage-shaped product S which is preferably situated at the opposite site of shaping box handling device 330.

Inserted shaping boxes 332 are conveyed in a shaping box feeding direction BD, preferably perpendicular to feeding direction FD, by suitable conveying means, as for instance at least one conveyor belt or a chain drive which define an at least substantially horizontally extending conveyor plane. Further, conveying means may preferably be driven electrically or mechanically by a spindle drive or the like.

In addition, it is also possible to provide suitable displacement means and/or at least one movable guide stop, whereby shaping boxes 332 of different sizes may be inserted into shaping box handling device 330. For instance, two conveyor belts may be shifted towards and away from each other depending on the size of shaping boxes 332. Further, at least one guide stop may be shifted towards and away from each other, for instance in case only one conveying belt as conveying means is provided. The displacement means and/or the at least one guide stop may be moved manually or by means of at least one suitable drive, which may be a spindle drive or the like, having preferably an integrated control system which controls the displacement means and/or the at least one guide stop depending on the size of shaping boxes 332.

Shaping box 332 preferably has an elongated rectangular shape, consisting of a bottom plate and four side plates arranged at right angles to each other. Shaping box 332 further has a length which corresponds to the length of sausage-shaped product S, wherein it may be conceivable to provide a shaping box 332 having a slightly larger length than that of sausage-shaped product S, in order to ensure an appropriate receiving of said sausage-shaped product S.

Shaping boxes 332 are preferably inserted into and removed from shaping box handling device 330 automatically, for instance, by means of a handling device such as a robot, wherein also an operating person may be conceivable, in particular for inserting empty shaping boxes 332 in insertion position of shaping box handling device 330. Moreover, a stock for shaping boxes 332 can be provided from which a shaping box 332 to be filled with a sausage-shaped product S can be removed.

In a preferred embodiment, conveyor means 310 are capable of releasing sausage-shaped product S after said sausage-shaped product S is conveyed to a so-called releasing position by said conveyor means 310.

By using a single conveyor belt 310a as conveyor means 310, said single conveyor belt 310a is capable of releasing said sausage-shaped product S in the releasing position. For this purposes, conveyor belt 310a may be shifted by shifting means or a shifting assembly 316 in a shifting direction SD perpendicular to feeding direction FD, preferably horizontally. By doing this, sausage-shaped product S positioned in the releasing position falls down in a release direction RD, preferably substantially perpendicular to feeding direction FD, into shaping box 332 positioned underneath conveyor means 320 in the receiving position.

To ensure that sausage-shaped product S released by single conveyor belt 310a falls into shaping box 332, a guiding side wall may be provided, which is situated between single conveyor belt 310a and shaping box 332 in a vertical manner. Guiding side wall is positioned such that released sausage-shaped product S falls or rather is guided into shaping box 332. Depending on the shifting direction SD of single conveyor belt 310a, guiding side wall is arranged parallel or rather coaxial to longitudinal side plate of shaping box 332 and parallel to feeding direction FD.

By using two separate conveyor belts 310a, 310b, it is also possible to release said sausage-shaped product S in the releasing position. For this purposes, conveyor belts 310a, 310b may be shifted reversibly by shifting means or the shifting assembly 316 preferably simultaneously in opposite directions, i.e. towards and away from each other, perpendicular to feeding direction FD. It may be desirable if only one of the conveyor belts 310a, 310b shifts or rather is shiftable to release sausage-shaped product S.

In order to receive sausage-shaped product S in shaping box 332, dimensions of shaping box 332 correspond to the desired dimensions of sausage-shaped product S. Preferably, length of shaping box 332 is slightly larger than that of sausage-shaped product S. Same is true if sausage-shaped product S consists of two or more sausages which are not separated from each other.

In another preferred embodiment, guiding means 320 are capable of releasing sausage-shaped product S from conveyor means 310, wherein sausage-shaped product S is positioned in the releasing position. Shifting means 316 are capable of shifting side walls 322, 324 of guiding means 320 preferably simultaneously in a shifting direction SD perpendicular to feeding direction FD, preferably horizontally. By doing this, sausage-shaped product S positioned in the releasing position falls down in a release direction RD, preferably substantially perpendicular to feeding direction FD, into shaping box 332, which is positioned laterally underneath conveyor means 320 in the receiving position.

In order to release sausage-shaped product S in the releasing position, sausage-shaped product S located in the releasing position may be detected by detection means or a detection device (not shown), such as, for instance, a light barrier, a capacitive sensor, a mechanical sensor and/or an imaging sensor. After detecting sausage-shaped product S in the releasing position, conveyor means 310 or guiding means 320 are capable of shifting perpendicular to feeding direction FD in the above described manner, in order to release sausage-shaped product S from conveyor means 310 into shaping box 332 positioned in the receiving position. Sausage-shaped product S preferably may be released while conveyor means 310 are stopped, but releasing sausage-shaped product S while conveyor means 310 are running is also possible. Furthermore, it may be conceivable to release sausage-shaped product S while conveyor means 310 move slower than usual.

Further, at least one stopper element 318 may be provided slightly above conveyor means 310 to stop sausage-shaped product S in the releasing position. To detect sausage-shaped product S in the releasing position, at least one sensor may be provided which is capable of detecting sausage-shaped product S which touches the at least one stopper element 318. Any suitable sensor may be used for detecting sausage-shaped product S, such as a contact sensor or a touch sensor for example.

The at least one stopper element 318 is preferably movable or completely removable. By moving the at least one stopper element 318 along conveyor means 310, releasing position of sausage-shaped product S changes correspondingly.

According to this, also the receiving position changes, which may be conceivable, if length of sausage-shaped product S changes. By completely removing the at least one stopper element 318, system 300 may act as a conveying device only. According to this, also detection means may be movable in the same manner. Advantageously, this simplifies and speeds up retooling process of system 300, in order to process sausage-shaped products S having different lengths and/or widths.

After receiving said sausage-shaped product S in shaping box 332, shaping box handling device 330 conveys shaping boxes 332, which preferably lie next to each other in transverse direction, in shaping box feeding direction BD and pushes an empty shaping box 332 in the receiving position for receiving next sausage-shaped product S positioned on conveyor means 310 in the releasing position. Moving of shaping boxes 332 in shaping box handling device 330 may be accomplished by any suitable conveying means, as for example a chain conveyor or at least one conveyor belt as described above.

In the following, a method for controlling system 300 for transferring sausage-shaped products S, like sausages, containing a flowable filling material in a tubular or bag-shaped packaging casing from discharge device 110 of a processing machine 100 for processing the sausage-shaped products S to handling device for said sausage-shaped products S is described.

Firstly, sausage-shaped product S is transferred from discharge device 110 which is preferably a clipping machine to conveyor means 310 of system 300. Preferably discharge device 110 and conveyor means 310 are connected by bridge 220, in order to facilitate the transition between discharge device 110 and conveyor means 310.

Conveyor means 310 convey sausage-shaped product S in feeding direction FD being at least substantially coaxial with discharge direction DD until sausage-shaped product S reaches the releasing position, wherein sausage-shaped product S is guided by side walls 322, 324 of guiding means 320 to ensure that sausage-shaped product S has the desired width and orientation relative to conveyor means 310.

After sausage-shaped product S has reached the releasing position, conveyor means 310 or guiding means 320 shift in the shifting direction SD substantially perpendicular to feeding direction FD, preferably horizontally. A shaping box 332 is positioned in the receiving position underneath or laterally underneath conveyor means 310 into which sausage-shaped product S falls, after sausage-shaped product S has been released by conveyor means 310 or guiding means 320.

Afterwards, shaping box 332 filled with sausage-shaped product S is preferably transferred in shaping box feeding direction BD substantially perpendicular to the feeding direction FD until an end position is reached in which the filled shaping box 332 is picked up by a handling device, such as a robot or the like. Preferably at the same time, another shaping box 332 is moved into the receiving position to receive the next sausage-shaped product S.

In case of any occurring errors, in order to avoid any damages, system 300 and discharge device 110 may be shut off by a control system. To detect such an error, detecting means may be provided, for instance, at removal position of shaping box handling device 330 and also on or near conveyor means 310. Detecting means such as a touch sensor, a light barrier or an imaging sensor are capable of detecting filled shaping boxes 332 at removal position of shaping box handling device 330 which have not been picked up by handling device and/or sausage-shaped products S which have not been released by conveyor means 310 or guiding means 320.

The invention claimed is:

1. A system for transferring sausage-shaped products, containing a flowable filling material in a tubular or bag-shaped packaging casing from a discharge device of a processing machine for processing the sausage-shaped products to a handling device for the sausage-shaped products, the system comprising:
    a belt conveyor device for subsequently receiving sausage-shaped products discharged from the discharge device in a discharge direction and for conveying the sausage-shaped products in a feeding direction to a releasing position in which the sausage-shaped products can be removed from the belt conveyor device;
    a drive assembly for driving said belt conveyor device in the feeding direction being at least substantially parallel to the discharge direction of the discharge device;
    a guiding assembly for guiding the sausage-shaped products when conveyed by the belt conveyor device in the feeding direction; and
    at least one shaping box for subsequently receiving a sausage-shaped product released from the belt conveyor device in the releasing position, wherein the at least one shaping box is provided at least substantially underneath the belt conveyor device-in a receiving position for receiving the sausage-shaped product released in a release direction substantially perpendicular to the feeding direction.

2. The system according to claim 1,
    wherein the guiding assembly comprise at least two side walls which are arranged parallel to the feeding direction with a distance to each other substantially corresponding to the width of the sausage-shaped products to be conveyed by the belt conveyor device, and wherein the side walls are preferably mounted laterally above the belt conveyor device so that the sausage-shaped products on the belt conveyor device are guided by the side walls.

3. The system according to claim 2,
    wherein the at least two side walls of the guiding assembly are reversibly movable away and towards each other in a shifting direction perpendicular to the feeding direction, and wherein the side walls preferably move simultaneously.

4. The system according to claim 1, wherein the belt conveyor device includes:
    a first conveyor belt and a second conveyor belt, wherein the second conveyor belt is arranged laterally and parallel to the first conveyor belt; and
    a shifting assembly for reversibly shifting at least one of the conveyor belts of the belt conveyor device away and towards each other in a shifting direction perpendicular to the feeding direction, preferably horizontally.

5. The system according to claim 1, wherein the belt conveyor device includes:
    a single conveyor belt; and
    a shifting assembly for reversibly shifting the single conveyor belt in a shifting direction perpendicular to the feeding direction, preferably horizontally.

6. The system according to claim 1,
    wherein the shaping box positioned in the receiving position has a longitudinal axis which is parallel to the feeding direction.

7. The system according to claim 1,
    wherein the at least one shaping box has a length equal to or slightly larger than that of a sausage-shaped product to be received in the shaping box and a width which corresponds to the width of the sausage-shaped product.

8. The system according to claim 1,
    wherein a detection device is positioned such that a desired releasing position of the sausage-shaped product on the belt conveyor device is detected.

9. The system according to claim 1,
    wherein at least one stopper element is positioned such that the sausage-shaped product is stopped on the belt conveyor device at a desired releasing position.

10. The system according to claim 1,
    wherein a positioning device is arranged such that the releasing position of the sausage-shaped product and/or the receiving position of the shaping box can be detected by at least one sensor, such as a touch sensor.

11. The system according to claim 1,
    wherein the guiding assembly can be moved towards and away from each other depending on the dimensions of the sausage-shaped product.

12. The system according to claim 1,
    further comprising a bridge which connects the discharge device and the belt conveyor device.

13. A method for controlling a system for transferring sausage-shaped products containing a flowable filling material in a tubular or bag-shaped packaging casing from a discharge device of a processing machine for processing the sausage-shaped products to a handling device for said sausage-shaped products according to claim 1, comprising the steps of:
    transferring the sausage-shaped products from the discharge device to the belt conveyor device;
    subsequently conveying the sausage-shaped products in the feeding direction by the belt conveyor device to a releasing position, while the sausage-shaped product is guided by the guiding assembly;

subsequently releasing the sausage-shaped products by shifting the belt conveyor device or the guiding assembly in the shifting direction substantially perpendicular to the feeding direction preferably horizontally; and receiving the sausage-shaped product in the shaping box positioned in the receiving position, which is situated at least substantially underneath the belt conveyor device.

14. The method for controlling the system according to claim 13, wherein the filled shaping box is transferred in an end position in which the filled shaping box is picked up by the handling device.

15. The system according to claim 8, wherein the detection device is adjustable depending on the dimensions of the sausage-shaped product.

16. The system according to claim 9, wherein the at least one stopper element is adjustable depending on the dimensions of the sausage-shaped product.

17. The system according to claim 10, wherein the positioning device is adjustable depending on the dimensions of the sausage-shaped product.

* * * * *